(12) United States Patent
Parla et al.

(10) Patent No.: US 10,931,561 B2
(45) Date of Patent: Feb. 23, 2021

(54) DYNAMIC SPLIT TUNNELING

(71) Applicant: Cisco Technology, Inc., San Jose, CA (US)

(72) Inventors: Vincent E. Parla, North Hampton, NH (US); Valentiu Vlad Santau, Littleton, MA (US); Peter S. Davis, Wakefield, MA (US)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 15/660,208

(22) Filed: Jul. 26, 2017

(65) Prior Publication Data

US 2018/0309658 A1 Oct. 25, 2018

Related U.S. Application Data

(60) Provisional application No. 62/489,131, filed on Apr. 24, 2017.

(51) Int. Cl.
| | |
|---|---|
| *G06F 15/16* | (2006.01) |
| *H04L 12/715* | (2013.01) |
| *H04L 12/46* | (2006.01) |
| *H04L 12/741* | (2013.01) |
| *H04L 29/06* | (2006.01) |

(52) U.S. Cl.
CPC .......... *H04L 45/04* (2013.01); *H04L 12/4633* (2013.01); *H04L 12/4641* (2013.01); *H04L 45/54* (2013.01); *H04L 45/745* (2013.01); *H04L 63/0272* (2013.01)

(58) Field of Classification Search
CPC ....................................................... H04L 45/04
USPC ....................................................... 709/225
See application file for complete search history.

(56) References Cited

U.S. PATENT DOCUMENTS

| | | | |
|---|---|---|---|
| 8,280,946 B1* | 10/2012 | Badros | H04L 61/1511 |
| | | | 709/203 |
| 8,533,780 B2 | 9/2013 | Parla et al. | |
| 9,137,211 B2 | 9/2015 | Parla et al. | |
| 9,319,377 B2* | 4/2016 | Vempati | H04L 63/029 |
| 9,455,909 B2 | 9/2016 | Parla et al. | |
| 9,515,988 B2 | 12/2016 | Vempati et al. | |
| 2007/0061887 A1* | 3/2007 | Hoover | G06F 21/6218 |
| | | | 726/26 |
| 2011/0154477 A1* | 6/2011 | Parla | H04L 63/0272 |
| | | | 726/15 |

(Continued)

*Primary Examiner* — Hamza N Algibhah
(74) *Attorney, Agent, or Firm* — Edell, Shapiro & Finnan, LLC

(57) ABSTRACT

A computing device dynamically excludes/includes traffic from/in a secure tunnel based on the domain name of the destination of the traffic. The computing device establishes a secure tunnel from the computing device, and receives a request to access a remote resource at a domain name. The computing device resolves the domain name at a domain name server and receives a resolved network address associated with the domain name. The computing device determines whether to send the request inside the secure tunnel or outside the secure tunnel by comparing the domain name to a split tunneling policy. Based on the comparison with the split tunneling policy, the computing device sends the request to the resolved network address either outside the secure tunnel or inside the secure tunnel.

20 Claims, 6 Drawing Sheets

(56) References Cited

U.S. PATENT DOCUMENTS

| | | | |
|---|---|---|---|
| 2013/0111040 A1* | 5/2013 | Vempati | H04L 63/029 |
| | | | 709/227 |
| 2013/0111066 A1* | 5/2013 | Vempati | H04L 61/1511 |
| | | | 709/245 |
| 2013/0179551 A1* | 7/2013 | Li | H04L 63/0272 |
| | | | 709/223 |
| 2015/0195243 A1* | 7/2015 | Roskind | G06F 16/95 |
| | | | 709/213 |
| 2017/0346856 A1* | 11/2017 | Newell | H04L 63/20 |

* cited by examiner

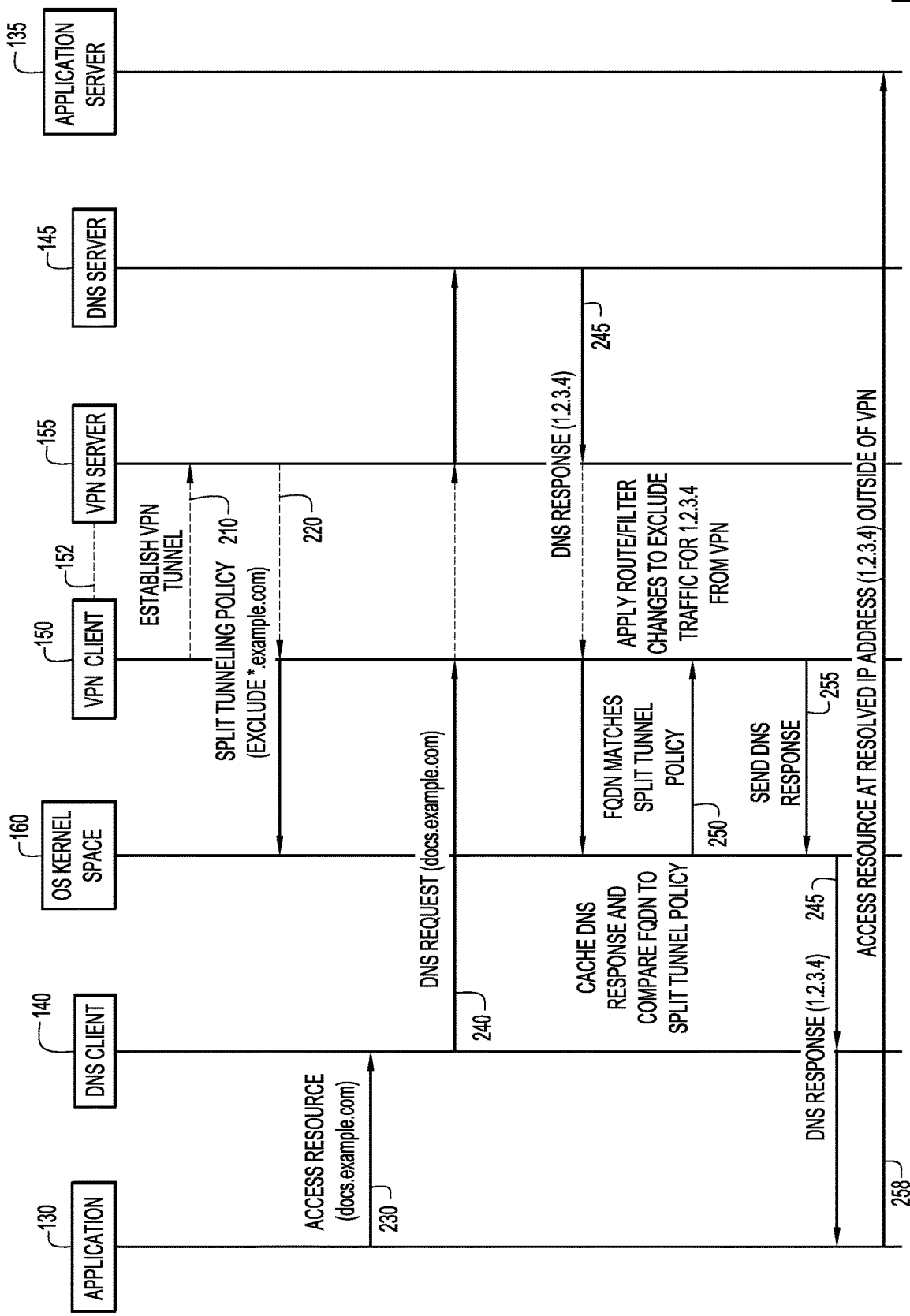

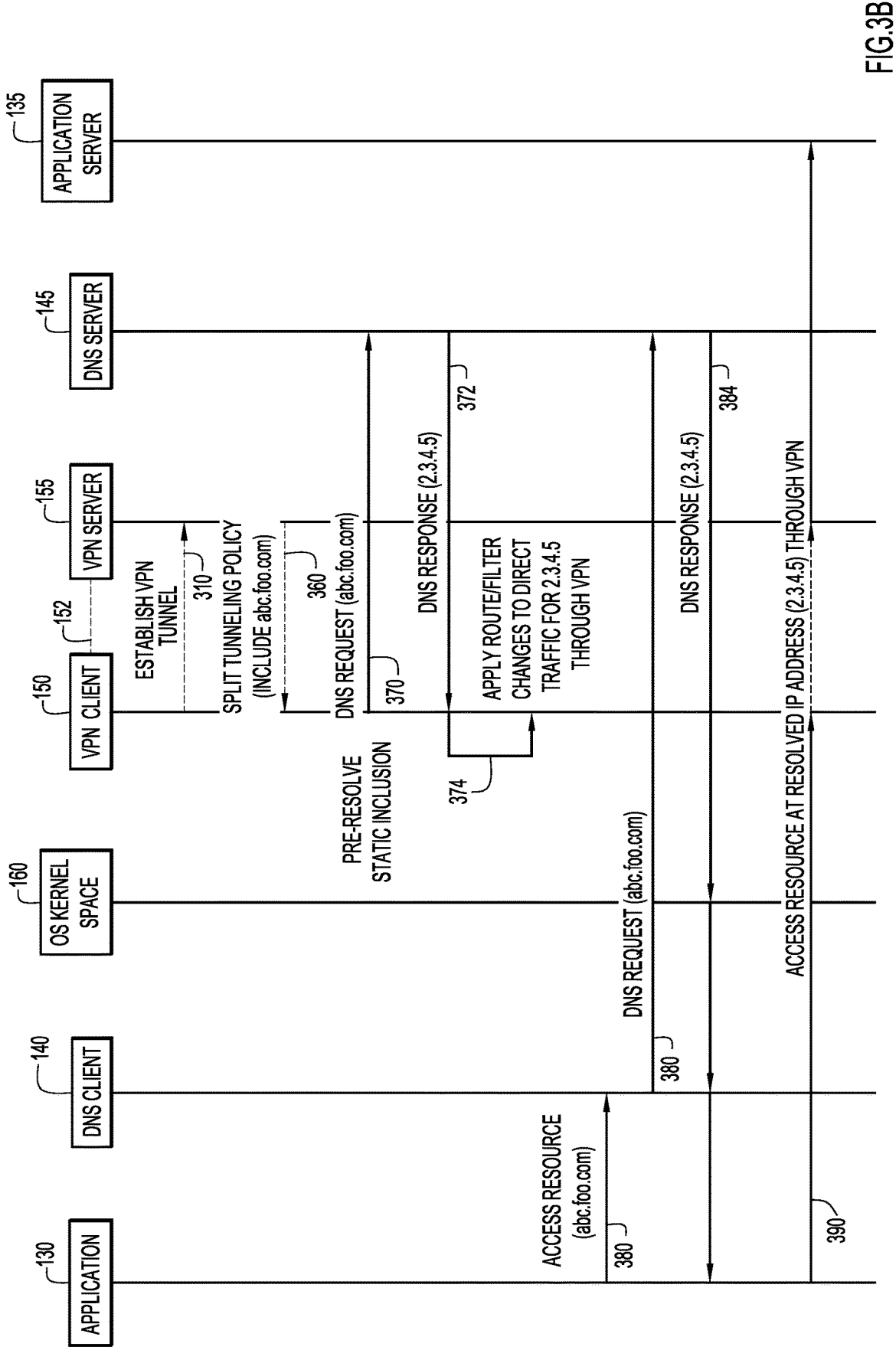

DYNAMIC SPLIT TUNNELING

PRIORITY CLAIM

This application claims priority to U.S. Provisional Patent Application No. 62/489,131, filed Apr. 24, 2017, the entirety of which is incorporated herein by reference.

TECHNICAL FIELD

The present disclosure relates to network and computer security.

BACKGROUND

Split tunneling is a Virtual Private Network (VPN) feature that allows an administrator to provision policies that include and/or exclude network traffic directed to specific Internet Protocol (IP) addresses or networks from a VPN tunnel. Historically, IPv4 was the primary networking protocol available and resources were at fixed IP addresses.

The advent of orchestrated compute pools where many services can migrate across infrastructure has made split tunneling more difficult to manage and maintain. For example, services such as email, document sharing, websites may all be hosted from the same company on the same IP pool. These services may resolve to different IP addresses based on the location of the user or load of cloud-hosted compute resources.

Hosting multiple services from a single pool of IP addresses presents a challenge to an administrator who wants to include/exclude only one service from the VPN tunnel while forcing other services over the VPN tunnel. Additionally, IPv6 and Internet Service Provider (ISP) Network Address Translation (NAT), IPv6-to-IPv4 translation, IPv4-to-IPv6 translation and other network translation schemes present additional challenges to effectively tuning VPN policies for split tunneling.

BRIEF DESCRIPTION OF THE DRAWINGS

FIG. 2A is a sequence diagram of messages passed between computing elements to establish dynamic split tunnel exclusion based on a wildcard split tunneling policy, according to an example embodiment.

FIG. 3B is a sequence diagram of messages passed between computing elements to pre-resolve a static domain name inclusion in a dynamic split tunnel policy, according to an example embodiment.

DESCRIPTION OF EXAMPLE EMBODIMENTS

Overview

Figure 1:
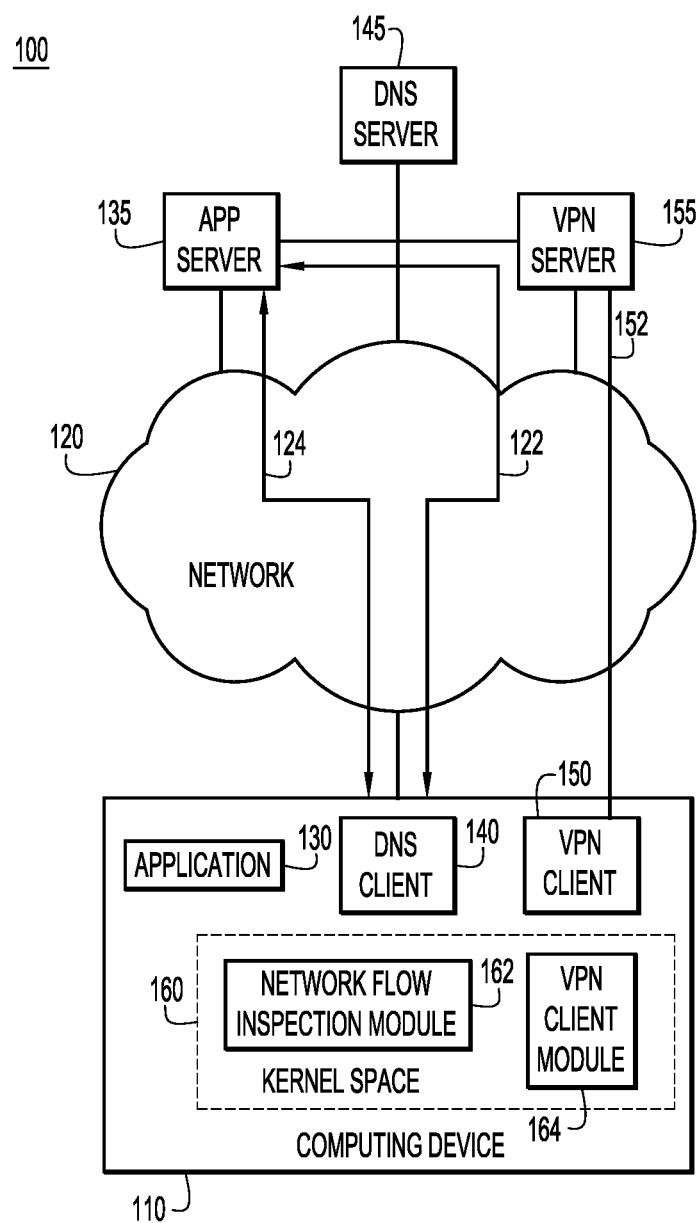
FIG. 1 is a simplified block diagram of a system for dynamic split tunneling, according to an example embodiment.

The techniques presented herein provide for a computing device to dynamically exclude/include traffic from/in a secure tunnel based on the domain name of the destination of the traffic. The method includes establishing a secure tunnel from the computing device. The computing device receives a request to access a remote resource associated with a first domain name. The computing device resolves the first domain name by receiving a resolved network address associated with the first domain name from a domain name server. The method also includes determining whether to send the request inside the secure tunnel or outside the secure tunnel by comparing the first domain name to a split tunneling policy. The computing device sends the request to the resolved network address outside/inside the secure tunnel, based on a determination that the first domain name matches an entry in the split tunneling policy.

DETAILED DESCRIPTION

The dynamic split tunneling system and techniques presented herein enable split tunneling after VPN tunnel establishment based on the host server name. The dynamic split tunneling system may be configured to include traffic in the VPN tunnel by default and dynamically exclude traffic to one or more specific host names. Alternatively, the dynamic split tunneling system may be configured to exclude traffic from the VPN tunnel by default and dynamically include traffic to one or more specific host names. Additionally, the dynamic split tunneling system presented herein is agnostic to the protocol and/or application of the network traffic. In other words, the dynamic split tunneling system described herein is functionally identical for HyperText Transfer (HTTP) traffic from a web browser or for User Datagram Protocol (UDP) traffic from a Voice over Internet Protocol (VoIP) application.

In one example, network traffic to a host server "mail.company.com" would be configured by the VPN administrator to be dynamically excluded from the VPN at runtime. After establishing a VPN tunnel, and an application attempts to connect to "mail.company.com" the VPN client will automatically change the routing table and filters to allow the connection to be made outside of the VPN tunnel. This allows for the dynamic provisioning of routes and filters to match the resolved IP address (IPv4 or IPv6) of the server host (e.g. "mail.company.com").

The VPN client begins to dynamically provision the routes and filters by observing the address(es) resolved by a Domain Name System (DNS) for a list of predetermined hosts (e.g., passed down from a security platform as part of split tunneling policy). The VPN client dynamically provisions the local routing table and filters to exclude (or include) the associated IP address(es). In one example, the VPN software could pre-resolve the host names after receiving the split tunneling policy.

Alternatively, the split tunneling policy may include predetermined conditions for domain names (e.g., wildcard domain names: *.company.com), and the VPN software may not be able practically to pre-resolve every domain name indicated in the split tunneling policy. In this case, the VPN software could resolve the host names dynamically at the time an application on the endpoint attempts to connect to a host server. The VPN software may be configured to exclude (or include) domain names that satisfy the predetermined conditions (e.g., wildcards) dynamically when an application sends a DNS request to resolve a domain name (e.g., abc.company.com) that satisfies the predetermined conditions.

In another example, the split tunneling policy may include multiple predetermined conditions that define which domain names are to be included/excluded from the VPN tunnel. For instance, the VPN administrator may define a policy that includes all domain names in the VPN tunnel by default, excludes *.company.com from the VPN tunnel, but includes *.secure.company.com.

Referring now to FIG. 1, a simplified block diagram illustrates a dynamic split tunneling system 100. The system 100 enables a computing device 110 to dynamically provision a split VPN tunnel across a network 120. The split VPN tunnel includes a path 122 that traverses the network 120 at least partially inside a VPN tunnel. The split VPN tunnel also includes a path 124 that traverses the network 120 outside of the VPN tunnel. The computing device 110 includes an application 130 that connects to an application server 135 over the network 120. To resolve the domain name of the application server 135, the computing device 110 includes a Domain Name Service (DNS) client 140. In one example, the DNS client 140 may be integrated with the application 130. The DNS client 140 resolves domain names by sending the domain names to a DNS server 145 across the network 120.

The computing device 110 also includes a VPN client 150 that establishes a VPN tunnel 152 with a VPN server 155 across the network 120. In one example, the network traffic tunneled to the VPN server 155 inside the VPN tunnel 152 may be directed to the DNS server 145 and/or the application server 135 over the network 120 or through other network paths. The computing device 110 includes an operating system with a kernel space 160. The kernel space 160 includes a network flow inspection component 162 and a VPN client module 164 to enable the computing device to inspect DNS traffic and dynamically provision the system routing table and IP filters according to the techniques presented herein. The network flow inspection component 162 is configured to process infrastructure tasks, such as packet notification and injection. The VPN client module 164 is configured to receive domain name configurations from the VPN client 150 and cache matching DNS responses to the domain name request. The VPN client module 164 also notifies the VPN client 150 to enforce the VPN tunnel exception(s). Additionally, the VPN client module 164 injects the cached DNS response into the Transmission Control Protocol/Internet Protocol (TCP/IP) stack upon receiving confirmation of the exception enforcement (e.g., provisioning the system routing table and IP filters) from the VPN client 150.

Figure 2B:
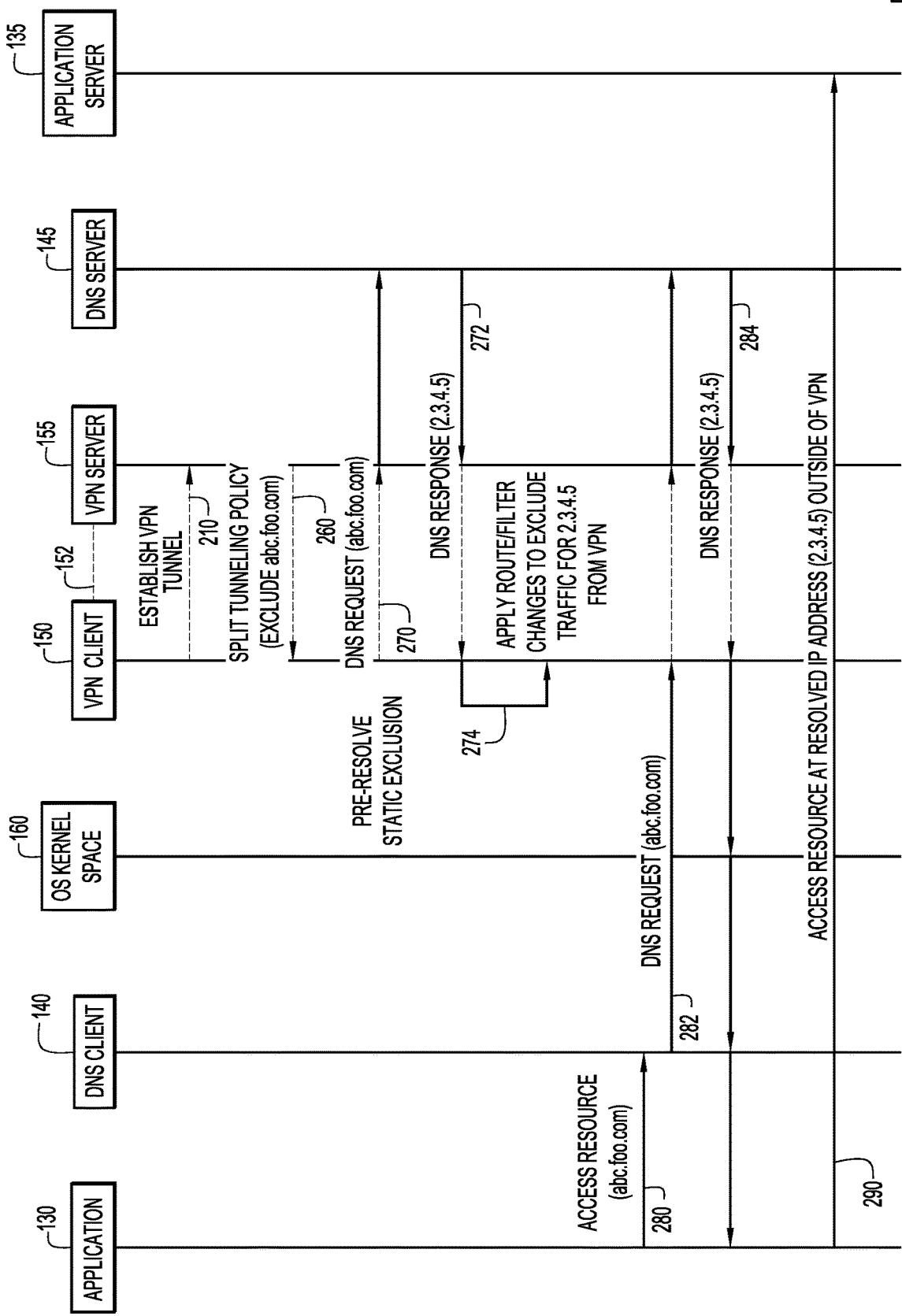
FIG. 2B is a sequence diagram of messages passed between computing elements to pre-resolve a static domain name exclusion in a dynamic split tunnel policy, according to an example embodiment.

Referring now to FIG. 2A and FIG. 2B, sequence diagrams illustrate messages passed between elements of the dynamic split tunnel system 100 to dynamically exclude specified domain names. In these examples, the VPN configuration specifies that the traffic targeting certain server host names is excluded from the VPN tunnel. The server host names may be specified as Fully Qualified Domain Names (FQDNs) or via wildcard notation (e.g., *.company.com). The VPN client 150 may pre-resolve the excluded FQDNs and enforce tunnel exclusion of the resulting IP addresses after establishing the VPN tunnel. However, traffic to host names matching the wildcard exclusion (e.g., *.company.com) would be dynamically excluded from tunneling, upon inspecting corresponding DNS response traffic.

Referring specifically to FIG. 2A, a sequence diagram illustrates messages passed between elements of the dynamic split tunnel system 100 that is configured to dynamically exclude wildcard host names. Reference is also made to FIG. 1 for purposes of the description of FIG. 2A.

The VPN client 150 sends a message 210 to establish the VPN tunnel 152 with the VPN server 155. The VPN server 155 responds with message 220, which includes the split tunneling policy. The split tunneling policy received from the VPN server 155 requires that all traffic is tunneled, except if the traffic matches specific wildcard host name exclusions (e.g., *.example.com). The split tunneling policy in message 220 is also received and stored in the kernel space 160 (e.g., in the VPN client module 164).

The application 130 sends a message 230 to access resources hosted by an application server 135 whose domain name matches the wildcard host name exclusion (e.g., docs.example.com). The DNS client 140 sends a DNS request 240 to resolve the domain name of the application server 135 through the DNS server 145. The DNS server 145 responds with the network address (e.g., 1.2.3.4) corresponding to the domain name. The DNS response 245 is inspected and processed by elements in the kernel space 160 (e.g., the network flow inspection module 162). In this example, the DNS request 240 and the DNS response 245 are configured to be sent through the VPN tunnel 152. Alternatively, the DNS request 240 and the DNS response 245 may be configured to be sent outside of the VPN tunnel 152.

Elements in the kernel space 160 cache the DNS response 245 and compare the domain name (e.g., docs.example.com) to the split tunneling policy (e.g., exclude *.example.com). If the domain name matches the split tunneling policy exclusion, then the computing device 110 configures the dynamic tunnel exclusion for traffic to the application server 135. Elements in the kernel space 160 send a message 250 to the VPN client 150 indicating which network address to exclude from the VPN tunnel 152. For instance, the network flow inspection infrastructure 162 may pass the DNS response 245 to the VPN client module 164, and the VPN client module 164 may inspect the DNS response 245 corresponding to the name resolution for the application server 135. Before passing the DNS response 245 to the TCP/IP stack, the VPN client module 164 in the kernel space 160 sends the message 250 to the VPN client 150 causing the VPN client 150 to perform the necessary route and filtering adjustments to exclude traffic to the corresponding IP address(es) from the VPN tunnel 152.

The VPN client 150 notifies the kernel space 160 once the VPN client 150 has installed/updated the appropriate system routes and filters to exclude from the VPN tunnel the network address of the application server 135. The kernel space 160 delays the DNS response 245 from being passed to the TCP/IP stack until the VPN client 150 signals completion of the route and filter adjustments. In the case where a DNS request for the domain name does not match one of the exclusion rules, the DNS response is simply allowed to continue up the TCP/IP stack to the application. In a non-matching scenario, no dynamic tunnel exclusion is applied and the corresponding application traffic is directed via the VPN tunnel.

In one example, the route and filtering adjustments for dynamic tunnel exclusions are performed as needed. The VPN client 150 maintains a mapping between the DNS response query names (e.g., FQDNs) and corresponding excluded IP addresses. If the DNS response query name received from the kernel space 160 is not already mapped, route and filtering adjustments are performed to exclude from tunneling the corresponding IP address(es) and the mapping is updated with the new query name and IP address(es). If the DNS response query name received from the kernel space 160 is already mapped, but to a different IP address, route and filtering adjustments are performed to only exclude from tunneling (for this particular query name) the newly received IP address(es) and the mapping is updated accordingly. The dynamic tunnel exclusions are described herein as being implemented as route and filtering adjustments. However, in other examples, the exclusions may be implemented with system routes (e.g., in a routing table), filters, or a combination of routes and filters.

Once the DNS response 245 has been passed back to the DNS client 140, the name resolution for the application server 135 is completed by the DNS client 140 and returned to the requesting application 130. The application 130 initiates access to the resources of the application server 135 by sending a message 258 to the network address in the DNS response 245. The application 130 accesses the resolved network address outside of the VPN tunnel due to the dynamic tunnel exclusion configured by the VPN client 150.

Referring specifically now to FIG. 2B, a sequence diagram illustrates messages passed between elements of the dynamic split tunnel system 100 that is configured to dynamically exclude a pre-resolved FQDN. As described in FIG. 2A, the VPN client 150 sends a message 210 to establish the VPN tunnel 152 with the VPN server 155. The VPN server 155 responds with message 260, which includes the split tunneling policy. The split tunneling policy received from the VPN server 155 requires that all traffic is tunneled, except if the traffic matches specific FQDNs (e.g., abc.foo.com).

To pre-resolve the FQDN in the split tunneling policy, the VPN client 150 sends a DNS request 270 to the DNS server 145. The DNS server 145 responds with a DNS response 272 including the network address (e.g., 2.3.4.5) corresponding to the domain name (e.g., abc.foo.com) in the DNS request 270. In this example, the DNS request 270 and the DNS response 272 are configured to be sent through the VPN tunnel 152. Alternatively, the DNS request 270 and the DNS response 272 may be configured to be sent outside of the VPN tunnel 152. The VPN client 150 performs the necessary route and filtering adjustments to exclude traffic to the corresponding network address(es) from the VPN tunnel 152.

The application 130 sends a message 280 to access resources hosted by an application server 135 whose domain name matches the FQDN exclusion (e.g., abc.foo.com) in the split tunneling policy. The DNS client 140 sends a DNS request 282 to resolve the domain name of the application server 135 through the DNS server 145. The DNS server 145 responds with the network address (e.g., 2.3.4.5) corresponding to the domain name. The DNS response 284 is passed all the way through to the DNS client 140. In this example, the DNS request 282 and the DNS response 284 are configured to be sent through the VPN tunnel 152. Alternatively, the DNS request 282 and the DNS response 284 may be configured to be sent outside of the VPN tunnel 152.

Once the DNS response 284 has been passed back to the DNS client 140, the name resolution for the application server 135 is completed by the DNS client 140 and returned to the requesting application 130. The application 130 initiates access to the resources of the application server 135 by sending a message 290 to the network address in the DNS response 284. The application 130 accesses the resolved network address outside of the VPN tunnel due to the dynamic tunnel exclusion configured by the VPN client 150 after the VPN tunnel was established.

In another example, the split tunneling policies described in FIG. 2A and FIG. 2B may be combined into a single policy. In other words, the split tunneling policy may include FQDNs and wildcard domain host names to exclude from the VPN tunnel. Additionally, the split tunneling policy may be received and/or updated at times other than immediately following the establishment of the VPN tunnel. For instance, a VPN administrator may add or remove specific domain names to the dynamic exclusion, and propagate the updated split tunneling policy to the computing device 110, which updates any relevant system routes and filters. Further, any pre-resolved FQDNs may be re-resolved after a predetermined amount of time (e.g., at periodic intervals) to ensure the resolved network addresses are up to date.

In yet another example, the computing device 110 may follow the sequence illustrated in FIG. 2A for FQDN exclusions as well as wildcard domain name exclusions. In other words, the kernel space may refrain from pre-resolving any FQDNs in the split tunneling policy, and wait to compare the domain name in subsequent DNS requests/responses to the FQDNs in the split tunneling policy before adjusting the routes and filters to exclude traffic to the FQDNs. In this case, the VPN client 150 will pass the split tunneling policy 260 to the kernel space 160. Thus, all exceptions to the default split tunneling policy are truly enforced dynamically, i.e., upon inspecting the corresponding DNS response traffic, in contrast to statically pre-resolving the FQDN exception (s).

Figure 3A:
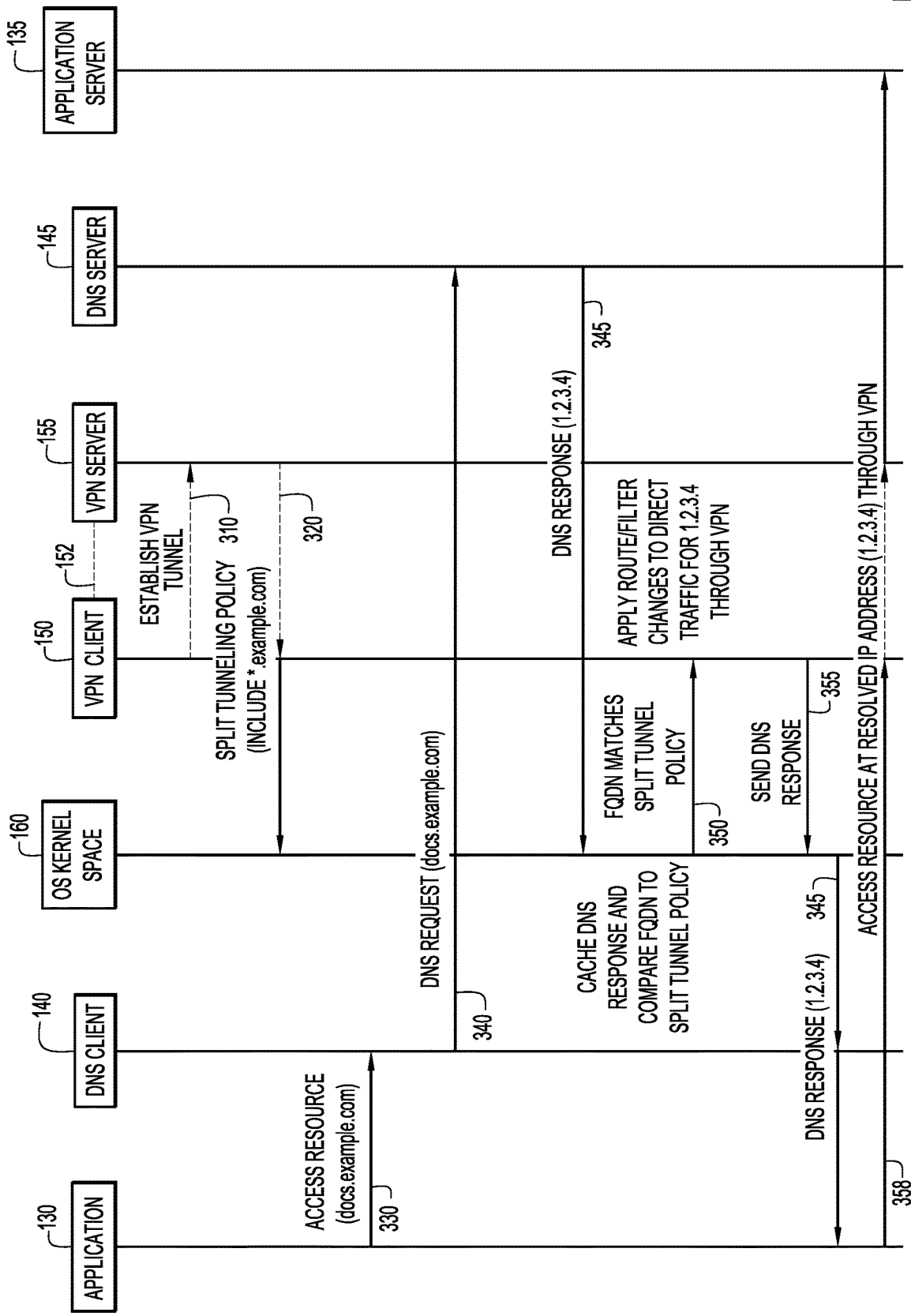
FIG. 3A is a sequence diagram of messages passed between computing elements to establish dynamic split tunnel inclusion based on a wildcard split tunneling policy, according to an example embodiment.

Referring now to FIG. 3A and FIG. 3B, sequence diagrams illustrate messages passed between elements of the dynamic split tunnel system 100 that is configured to dynamically include specified domain names. Reference is also made to FIG. 1 for purposes of this description. In these examples, the VPN configuration specifies that the traffic targeting certain server host names is included in the VPN tunnel. The server host names may be specified as Fully Qualified Domain Names (FQDNs) or via wildcard notation (e.g., *.company.com). The VPN client 150 may pre-resolve the included FQDNs and enforce tunnel inclusion of the resulting IP addresses after establishing the VPN tunnel. However, traffic to host names matching the wildcard inclusion (e.g., *.company.com) would be dynamically included in the VPN tunnel, upon inspecting corresponding DNS response traffic.

Referring specifically to FIG. 3A, a sequence diagram illustrates messages passed between elements of the dynamic split tunnel system 100 that is configured to dynamically include wildcard host names in the VPN tunnel 152. The VPN client 150 sends a message 310 to establish the VPN tunnel 152 with the VPN server 155. The VPN server 155 responds with message 320, which includes the split tunneling policy. The split tunneling policy received from the VPN server 155 requires that traffic is not tunneled by default, unless the traffic matches specific wildcard host name inclusions (e.g., *.example.com). The split tunneling policy in message 320 is also received and stored in the kernel space 160 (e.g., in the VPN client module 164).

The application 130 sends a message 330 to access resources hosted by an application server 135 whose domain name matches the wildcard host name inclusion (e.g., docs.example.com). The DNS client 140 sends a DNS request 340 to resolve the domain name of the application server 135 through the DNS server 145. The DNS server 145 responds with the network address (e.g., 1.2.3.4) corresponding to the domain name. The DNS response 345 is inspected and processed by elements in the kernel space 160 (e.g., the network flow inspection module 162). In this example, the DNS request 340 and the DNS response 345 are configured to be sent outside of the VPN tunnel 152. Alternatively, the DNS request 340 and the DNS response 340 may be configured to be sent through the VPN tunnel 152.

Elements in the kernel space 160 cache the DNS response 345 and compare the domain name (e.g., docs.example.com) to the split tunneling policy (e.g., include *.example.com). If the domain name matches the split tunneling policy inclusion, then the computing device 110 configures the dynamic tunnel inclusion for traffic to the application server 135. Elements in the kernel space 160 send a message 350 to the VPN client 150 indicating which network address to include in the VPN tunnel 152. For instance, the network flow inspection infrastructure 162 may pass the DNS response 345 to the VPN client module 164, and the VPN client module 164 may inspect the DNS response 345 corresponding to the name resolution for the application server 135. Before passing the DNS response 345 to the TCP/IP stack, the kernel space 160 sends the message 350 to the VPN client 150 causing the VPN client 150 to perform the necessary route and filtering adjustments to direct traffic to the corresponding IP address(es) through the VPN tunnel 152.

The VPN client 150 notifies the kernel space 160 once the VPN client 150 has installed/updated the appropriate system routes and filters to include in the VPN tunnel the network address of the application server 135. The kernel space 160 delays the DNS response 345 from being passed to the TCP/IP stack until the VPN client 150 signals completion of the route and filter adjustments. In the case where a DNS request for the domain name does not match one of the inclusion rules, the DNS response is simply allowed to continue up the TCP/IP stack to the application. In a non-matching scenario, no dynamic tunnel inclusion is applied and the corresponding application traffic is directed outside of the VPN tunnel.

In one example, the route and filtering adjustments for dynamic tunnel inclusions are performed as needed. The VPN client 150 maintains a mapping between the DNS response query names (e.g., FQDNs) and corresponding included IP addresses. If the DNS response query name received from the kernel space 160 is not already mapped, route and filtering adjustments are performed to direct traffic for the corresponding IP address(es) through the VPN tunnel and the mapping is updated with the new query name and IP address(es). If the DNS response query name received from the kernel space 160 is already mapped, but to a different IP address, route and filtering adjustments are performed to only include in the VPN tunnel traffic to the newly received IP address(es) (for this particular query name) and the mapping is updated accordingly.

Once the DNS response 345 has been passed back to the DNS client 140, the name resolution for the application server 135 is completed by the DNS client 140 and returned to the requesting application 130. The application 130 initiates access to the resources of the application server 135 by sending a message 358 to the network address in the DNS response 345. The application 130 accesses the resolved network address through the VPN tunnel due to the dynamic tunnel inclusion configured by the VPN client 150.

Referring specifically now to FIG. 3B, a sequence diagram illustrates messages passed between elements of the dynamic split tunnel system 100 that is configured to dynamically include a pre-resolved FQDN in the VPN tunnel 152. As described in FIG. 3A, the VPN client 150 sends a message 310 to establish the VPN tunnel 152 with the VPN server 155. The VPN server 155 responds with message 360, which includes the split tunneling policy. The split tunneling policy received from the VPN server 155 requires that all traffic is sent outside the VPN tunnel 152, unless the traffic is directed to a domain name that matches specific FQDNs (e.g., abc.foo.com).

To pre-resolve the FQDN in the split tunneling policy, the VPN client 150 sends a DNS request 370 to the DNS server 145. The DNS server 145 responds with a DNS response 372 including the network address (e.g., 2.3.4.5) corresponding to the domain name (e.g., abc.foo.com) in the DNS request 370. In this example, the DNS request 370 and the DNS response 372 are configured to be sent outside of the VPN tunnel 152. Alternatively, the DNS request 370 and the DNS response 372 may be configured to be sent through the VPN tunnel 152. The VPN client 150 performs the necessary route and filtering adjustments to direct traffic to the corresponding network address(es) through the VPN tunnel 152.

The application 130 sends a message 380 to access resources hosted by an application server 135 whose domain name matches the FQDN inclusion (e.g., abc.foo.com) in the split tunneling policy. The DNS client 140 sends a DNS request 382 to resolve the domain name of the application server 135 through the DNS server 145. The DNS server 145 responds with the network address (e.g., 2.3.4.5) corresponding to the domain name. The DNS response 384 is passed all the way through to the DNS client 140. In this example, the DNS request 382 and the DNS response 384 are configured to be sent outside of the VPN tunnel 152. Alternatively, the DNS request 382 and the DNS response 384 may be configured to be sent through the VPN tunnel 152.

Once the DNS response 384 has been passed back to the DNS client 140, the name resolution for the application server 135 is completed by the DNS client 140 and returned to the requesting application 130. The application 130 initiates access to the resources of the application server 135 by sending a message 390 to the network address in the DNS response 384. The application 130 accesses the resolved network address through the VPN tunnel due to the dynamic tunnel inclusion configured by the VPN client 150 after the VPN tunnel was established.

In another example, the split tunneling policies described in FIG. 3A and FIG. 3B may be combined into a single policy. In other words, the split tunneling policy may include FQDNs and wildcard domain host names to include in the VPN tunnel. Additionally, the split tunneling policy may be received and/or updated at times other than immediately following the establishment of the VPN tunnel. For instance, a VPN administrator may add or remove specific domain names to the dynamic inclusion, and propagate the updated split tunneling policy to the computing device 110, which updates any relevant system routes and filters. Further, any pre-resolved FQDNs may be re-resolved after a predetermined amount of time (e.g., at periodic intervals) to ensure the resolved network addresses are up to date.

In yet another example, the computing device 110 may follow the sequence illustrated in FIG. 3A for FQDN inclusions as well as wildcard domain name inclusions. In other words, the kernel space may refrain from pre-resolving any FQDNs in the split tunneling policy, and wait to compare the domain name in subsequent DNS requests/responses to the FQDNs in the split tunneling policy before adjusting the routes and filters to include traffic to the FQDNs in the VPN tunnel. In this case, the VPN client 150 will pass the split tunneling policy 360 to the kernel space 160. Thus, all exceptions to the default split tunneling policy are truly enforced dynamically, i.e., upon inspecting the corresponding DNS response traffic, in contrast to statically pre-resolving the FQDN exception(s).

In still another example, the split tunneling policy may include a combination of multiple inclusions and/or exclusions to enable further granularity in specifically defining which traffic to direct through the VPN tunnel. For instance, a split tunneling policy may include a hierarchical combination of inclusion and exclusion rules. Each rule may define one or more specific domain names (i.e., FQDNs) to be included/excluded, as well as wildcard domains to be included/excluded.

Figure 4:
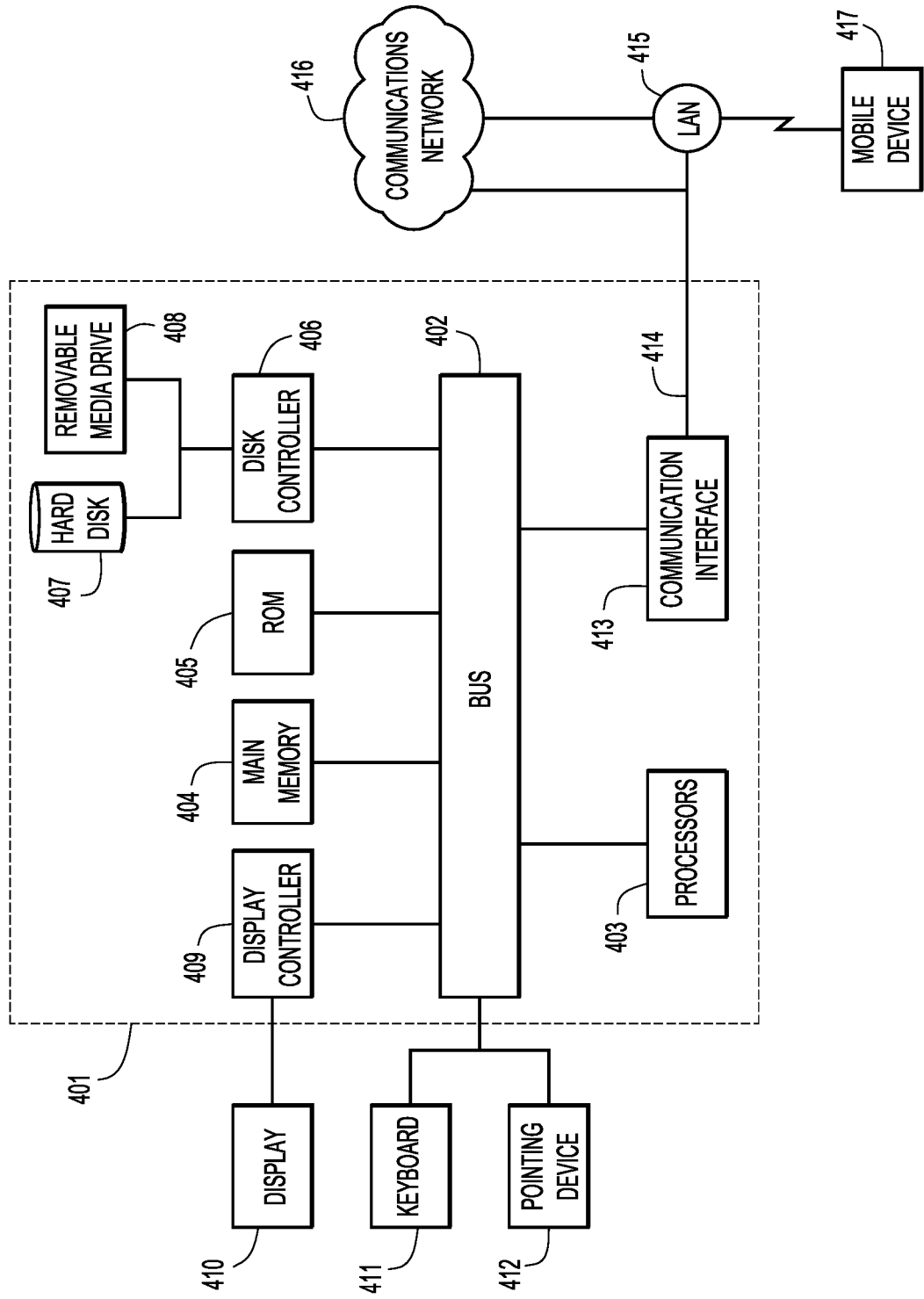
FIG. 4 is a simplified block diagram of a device that may be configured to perform methods presented herein, according to an example embodiment.

Referring now to FIG. 4, an example of a block diagram of a computer system 401 that may be representative of the computing device 110 in which the embodiments presented may be implemented is shown. The computer system 401 may be programmed to implement a computer based device, such as a laptop computer, desktop computer, tablet computer, smart phone, internet phone, network element, or other computing device. The computer system 401 includes a bus 402 or other communication mechanism for communicating information, and a processor 403 coupled with the bus 402 for processing the information. While the figure shows a single block 403 for a processor, it should be understood that the processors 403 may represent a plurality of processing cores, each of which can perform separate processing. The computer system 401 also includes a main memory 404, such as a random access memory (RAM) or other dynamic storage device (e.g., dynamic RAM (DRAM), static RAM (SRAM), and synchronous DRAM (SD RAM)), coupled to the bus 402 for storing information and instructions to be executed by processor 403. In addition, the main memory 404 may be used for storing temporary variables or other intermediate information during the execution of instructions by the processor 403.

The computer system 401 further includes a read only memory (ROM) 405 or other static storage device (e.g., programmable ROM (PROM), erasable PROM (EPROM), and electrically erasable PROM (EEPROM)) coupled to the bus 402 for storing static information and instructions for the processor 403.

The computer system 401 also includes a disk controller 406 coupled to the bus 402 to control one or more storage devices for storing information and instructions, such as a magnetic hard disk 407, and a removable media drive 408 (e.g., floppy disk drive, read-only compact disc drive, read/write compact disc drive, compact disc jukebox, tape drive, and removable magneto-optical drive, solid state drive, etc.). The storage devices may be added to the computer system 401 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 401 may also include a display controller 409 coupled to the bus 402 to control a display 410, such as a cathode ray tube (CRT), liquid crystal display (LCD) or light emitting diode (LED) display, for displaying information to a computer user. The computer system 401 includes input devices, such as a keyboard 411 and a pointing device 412, for interacting with a computer user and providing information to the processor 403. The pointing device 412, for example, may be a mouse, a trackball, track pad, touch screen, or a pointing stick for communicating direction information and command selections to the processor 403 and for controlling cursor movement on the display 410. In addition, a printer may provide printed listings of data stored and/or generated by the computer system 401.

The computer system 401 performs a portion or all of the processing steps of the operations presented herein in response to the processor 403 executing one or more sequences of one or more instructions contained in a memory, such as the main memory 404. Such instructions may be read into the main memory 404 from another computer readable storage medium, such as a hard disk 407 or a removable media drive 408. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 401, for driving a device or devices for implementing the operations presented herein, and for enabling the computer system 401 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 401 also includes a communication interface 413 coupled to the bus 402. The communication interface 413 provides a two-way data communication coupling to a network link 414 that is connected to, for example, a local area network (LAN) 415, or to another communications network 416 such as the Internet. For example, the communication interface 413 may be a wired or wireless network interface card to attach to any packet switched (wired or wireless) LAN. As another example, the communication interface 413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 413 sends and receives electrical, electromagnetic or optical signals that carry digital data streams representing various types of information.

The network link 414 typically provides data communication through one or more networks to other data devices. For example, the network link 414 may provide a connection to another computer through a local area network 415 (e.g., a LAN) or through equipment operated by a service provider, which provides communication services through a communications network 416. The local network 414 and the communications network 416 use, for example, electrical, electromagnetic, or optical signals that carry digital data streams, and the associated physical layer (e.g., CAT 5 cable, coaxial cable, optical fiber, etc.). The signals through the various networks and the signals on the network link 414 and through the communication interface 413, which carry the digital data to and from the computer system 401 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 401 can transmit and receive data, including program code, through the network(s) 415 and 416, the network link 414 and the communication interface 413. Moreover, the network link 414 may provide a connection through a LAN 415 to a mobile device 417 such as a personal digital assistant (PDA), tablet computer, laptop computer, or cellular telephone.

In summary, the techniques presented herein dynamically provision split tunneling after a VPN tunnel is established based on the host server name for environments where the resources to exclude (or include) from (or in) the established tunnel cannot be hard coded using fixed IP addresses/network blocks. Dynamic provisioning of routes and filters match the resolved IP address (IPv4 or IPV6) of the server host.

Roaming users may encounter networks where the IP addresses of the destination service are mutable and potentially different based on Network Address Translation (NAT), IPv6-to-IPv4 translation, IPv4-to-IPv6 translation, and other dual stack environmental factors. These environment present challenges to provisioning split tunnel rules for a VPN headend administrator as they have to know the specific impact of networking factors of the remote user.

The techniques presented herein provide the ability to express tunnel inclusions or exclusions by host name instead of IP address. This allows for more reliable split tunneling in modern networks where network compute pools are often shared with many services and the impact of IPv4/IPv6 and Internet Service Provider (ISP) specific networking configurations (NAT, 6-to-4, 4-to-6 tunnel, etc.) to the remote endpoint is hard to predict.

In one form, a method is provided for a computing device to dynamically exclude traffic from a secure tunnel based on the domain name of the destination of the traffic. The method includes establishing a secure tunnel from the computing device. The computing device receives a request to access a remote resource associated with a first domain name. The computing device resolves the first domain name by receiving a resolved network address associated with the first domain name from a domain name server. The method also includes determining whether to send the request inside the secure tunnel or outside the secure tunnel by comparing the first domain name to a split tunneling policy. The computing device sends the request outside the secure tunnel to the resolved network address based on a determination that the first domain name matches an entry in the split tunneling policy.

In another form, an apparatus is provided comprising a network interface unit and a processor coupled to the network interface unit. The network interface unit is configured to communicate with one or more remote computing devices. The processor is configured to establish a secure tunnel and receive a request to access a remote resource associated with a first domain name. The processor is also configured to resolve the first domain name by receiving from a domain name server, via the network interface unit, a resolved network address associated with the first domain name. The processor is configured to determine whether to send the request inside the secure tunnel or outside the secure tunnel by comparing the first domain name to a split tunneling policy. The processor is also configured to cause the network interface unit to send the request outside the secure tunnel to the resolved network address based on a determination that the first domain name matches an entry in the split tunneling policy.

In a further form, a non-transitory computer readable storage media is provided that is encoded with instructions that, when executed by a processor, cause the processor to dynamically exclude traffic from a secure tunnel based on the domain name of the destination of the traffic. The instructions cause the processor to establish a secure tunnel from the computing device. The processor receives a request to access a remote resource associated with a first domain name. The instructions cause the processor to resolve the first domain name by receiving a resolved network address associated with the first domain name from a domain name server. The instruction also cause the processor to determine whether to send the request inside the secure tunnel or outside the secure tunnel by comparing the first domain name to a split tunneling policy. The instructions cause the processor to send the request outside the secure tunnel to the resolved network address based on a determination that the first domain name matches an entry in the split tunneling policy.

In yet another form, a method is provided for a computing device to dynamically include traffic in a secure tunnel based on the domain name of the destination of the traffic. The method includes establishing a secure tunnel from the computing device. The computing device receives a request to access a remote resource associated with a first domain name. The computing device resolves the first domain name by receiving a resolved network address associated with the first domain name from a domain name server. The method also includes determining whether to send the request inside the secure tunnel or outside the secure tunnel by comparing the first domain name to a split tunneling policy. The computing device sends the request inside the secure tunnel to the resolved network address based on a determination that the first domain name matches an entry in the split tunneling policy.

In still another form, an apparatus is provided comprising a network interface unit and a processor coupled to the network interface unit. The network interface unit is configured to communicate with one or more remote computing devices. The processor is configured to establish a secure tunnel and receive a request to access a remote resource associated with a first domain name. The processor is also configured to resolve the first domain name by receiving from a domain name server, via the network interface unit, a resolved network address associated with the first domain name. The processor is configured to determine whether to send the request inside the secure tunnel or outside the secure tunnel by comparing the first domain name to a split tunneling policy. The processor is also configured to cause the network interface unit to send the request inside the secure tunnel to the resolved network address based on a determination that the first domain name matches an entry in the split tunneling policy.

In an additional form, a non-transitory computer readable storage media is provided that is encoded with instructions that, when executed by a processor, cause the processor to dynamically include traffic in a secure tunnel based on the domain name of the destination of the traffic. The instructions cause the processor to establish a secure tunnel from the computing device. The processor receives a request to access a remote resource associated with a first domain name. The instructions cause the processor to resolve the first domain name by receiving a resolved network address associated with the first domain name from a domain name server. The instruction also cause the processor to determine whether to send the request inside the secure tunnel or outside the secure tunnel by comparing the first domain name to a split tunneling policy. The instructions cause the processor to send the request inside the secure tunnel to the resolved network address based on a determination that the first domain name matches an entry in the split tunneling policy.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   establishing a secure tunnel from a computing device;
   obtaining a split tunneling policy having hierarchical entries associating domain names with an instruction to exclude traffic to the associated domain name from the secure tunnel or to include traffic to the associated domain name in the secure tunnel, the split tunneling policy organized in a hierarchy of exclusion entries and inclusion entries;
   receiving at the computing device a first request to access a remote resource on an application server associated with a first domain name;
   sending a domain name request from a Domain Name System (DNS) client at the computing device to a DNS server;
   receiving from the DNS server a resolved network address associated with the first domain name;
   determining whether to send the first request inside the secure tunnel to a secure network server or outside the secure tunnel to the application server at the resolved network address by comparing the first domain name to the split tunneling policy; and
   sending the first request outside the secure tunnel to the resolved network address based on a first determination that the first domain name matches an exclusion entry in the split tunneling policy and based on a second determination that the first domain name does not match a more specific inclusion entry in the hierarchy of the split tunneling policy.

2. The method of claim 1, further comprising generating at least one routing/filtering change for the resolved network address based on the first determination that the first domain name matches the exclusion entry in the split tunneling policy and the second determination that the first domain name does not match the more specific inclusion entry in the hierarchy of the split tunneling policy, the one or more routing/filtering change causing the first request to be sent outside of the secure tunnel.

3. The method of claim 2, further comprising:
   receiving a new network address associated with the first domain name; and
   updating a routing table and one or more filters with the new network address.

4. The method of claim 1, wherein each entry in the hierarchy of the split tunneling policy identifies a partial domain name or a full domain name.

5. The method of claim 4, wherein the partial domain name includes a wildcard.

6. The method of claim 1, further comprising:
   pre-resolving with the DNS at least one fully qualified domain name from at least one entry in the split tunneling policy to generate at least one pre-resolved network address; and
   generating at least one routing/filtering change for the at least one pre-resolved network address, the routing/filtering change causing any network traffic directed to the at least one pre-resolved network address to be excluded from the secure tunnel.

7. The method of claim 1, further comprising directing network traffic associated with a second domain name that does not match any entry in the split tunneling policy through the secure tunnel.

8. An apparatus comprising:
   a network interface unit configured to communicate with one or more remote computing devices; and
   a processor configured to:
   establish a secure tunnel;
   obtain a split tunneling policy having hierarchical entries associating domain names with an instruction to exclude traffic to the associated domain name from the secure tunnel or to include traffic to the associated domain name in the secure tunnel, the split tunneling policy organized in a hierarchy of exclusion entries and inclusion entries;
   receive a first request to access a remote resource on an application server associated with a first domain name;
   send a domain name request from a Domain Name System (DNS) client at the computing device to a DNS server;
   receive from the DNS server a resolved network address associated with the first domain name;
   determine whether to send the first request inside the secure tunnel to a secure network server or outside the secure tunnel to the application server at the resolved network address by comparing the first domain name to the split tunneling policy; and cause the network interface unit to send the first request outside the secure tunnel to the resolved network address based on a first determination that the first domain name matches an exclusion entry in the split tunneling policy and based on a second determination that the first domain name does not match a more specific inclusion entry in the hierarchy of the split tunneling policy.

9. The apparatus of claim 8, wherein the processor is further configured to generate at least one routing/filtering change for the resolved network address based on the first determination that the first domain name matches the exclusion entry in the split tunneling policy and the second determination that the first domain name does not match the more specific inclusion entry in the hierarchy of the split tunneling policy, the one or more routing/filtering change causing the first request to be sent outside of the secure tunnel.

10. The apparatus of claim 9, wherein the processor is further configured to:

receive via the network interface unit, a new network address associated with the first domain name; and update a routing table and one or more filters with the new network address.

11. The apparatus of claim 8, wherein each entry in the hierarchy of the split tunneling policy identifies a partial domain name or a full domain name.

12. The apparatus of claim 11, wherein the partial domain name includes a wildcard.

13. The apparatus of claim 8, wherein the processor is further configured to:

pre-resolve with the DNS at least one fully qualified domain name from at least one entry in the split tunneling policy to generate at least one pre-resolved network address; and generate one or more routing/filtering change for the at least one pre-resolved network address, the routing/filtering change causing any network traffic directed to the at least one pre-resolved network address to be excluded from the secure tunnel.

14. The apparatus of claim 8, wherein the processor is further configured to direct network traffic associated with a second domain name that does not match any entry in the split tunneling policy through the secure tunnel.

15. A method comprising:

establishing a secure tunnel from a computing device;

obtaining a split tunneling policy having entries associating domain names with an instruction to exclude traffic to the associated domain name from the secure tunnel or to include traffic to the associated domain name in the secure tunnel, the split tunneling policy organized in a hierarchy of exclusion entries and inclusion entries;

receiving from an application at the computing device a first request to access a remote resource on an application server associated with a first domain name;

sending a domain name request from a Domain Name System (DNS) client at the computing device to a DNS server;

receiving from the DNS server a resolved network address associated with the first domain name;

determining whether to send the first request inside the secure tunnel to a secure network server or outside the secure tunnel to the application server at the resolved network address by comparing the first domain name to the split tunneling policy; and sending the first request inside the secure tunnel to the secure network server based on a first determination that the first domain name matches an inclusion entry in the split tunneling policy and based on a second determination that the first domain name does not match a more specific exclusion entry in the hierarchy of the split tunneling policy, wherein the secure network server forwards the first request to application server at the resolved network address.

16. The method of claim 15, further comprising generating at least one routing/filtering change for the resolved network address based on the first determination that the first domain name matches the inclusion entry in the split tunneling policy and the second determination that the first domain name does not match the more specific exclusion entry in the hierarchy of the split tunneling policy, the routing/filtering change causing the first request to be sent inside of the secure tunnel.

17. The method of claim 16, further comprising:

receiving a new network address associated with the first domain name; and updating a routing table and one or more filters with the new network address.

18. The method of claim 15, wherein each entry in the hierarchy of the split tunneling policy identifies a partial domain name with a wildcard or a full domain name.

19. The method of claim 15, further comprising:

pre-resolving with the DNS at least one fully qualified domain name from at least one entry in the split tunneling policy to generate at least one pre-resolved network address; and generating one or more routing/filtering change for the at least one pre-resolved network address, the routing/filtering change causing any network traffic directed to the at least one pre-resolved network address to be included in the secure tunnel.

20. The method of claim 15, further comprising directing network traffic associated with a second domain name that does not match any entry in the split tunneling policy outside of the secure tunnel.

* * * * *